US007497903B2

(12) United States Patent
Wang et al.

(10) Patent No.: US 7,497,903 B2
(45) Date of Patent: Mar. 3, 2009

(54) MICRONIZED PERLITE FILLER PRODUCT

(75) Inventors: Bo Wang, Lompoc, CA (US); Timothy R. Smith, Lompoc, CA (US); Andrew L. Masters, Santa Barbara, CA (US); Nigel Julian Keith Danvers, Paris (FR)

(73) Assignee: Advanced Minerals Corporation, Santa Barbara, CA (US)

( * ) Notice: Subject to any disclaimer, the term of this patent is extended or adjusted under 35 U.S.C. 154(b) by 532 days.

(21) Appl. No.: 10/953,542

(22) Filed: Sep. 28, 2004

(65) Prior Publication Data

US 2006/0075930 A1    Apr. 13, 2006

(51) Int. Cl.
*C08K 7/26*    (2006.01)
(52) U.S. Cl. ................................. 106/409; 106/DIG. 2
(58) Field of Classification Search ................. 106/638, 106/409, DIG. 2
See application file for complete search history.

(56) References Cited

U.S. PATENT DOCUMENTS

| | | | |
|---|---|---|---|
| 2,431,884 A | | 12/1947 | Neuschotz |
| 2,602,782 A | | 7/1952 | Zoradi |
| 3,233,740 A | * | 2/1966 | Vander Linden et al. |
| 3,915,735 A | | 10/1975 | Moreland |
| 4,175,158 A | * | 11/1979 | Saunders .................... 502/202 |
| 4,260,498 A | | 4/1981 | Sample, Jr. et al. |
| 4,325,844 A | | 4/1982 | Olmsted, Jr. |
| 4,617,128 A | | 10/1986 | Ostreicher |
| 5,035,804 A | | 7/1991 | Stowe |
| 5,153,063 A | | 10/1992 | Okita et al. |
| 5,656,568 A | | 8/1997 | Shiuh et al. |
| 6,074,474 A | | 6/2000 | Broome et al. |
| 6,140,040 A | | 10/2000 | Palm et al. |
| 6,464,770 B1 | * | 10/2002 | Palm et al. .................. 106/409 |
| 6,712,898 B2 | * | 3/2004 | Palm et al. .................. 106/409 |

FOREIGN PATENT DOCUMENTS

| | | |
|---|---|---|
| EP | 0 758 560 A1 | 2/1997 |
| FR | 2 586 588 A1 | 3/1987 |
| JP | 08 019702 | 1/1996 |
| JP | H08-019702 A | 1/1996 |
| SU | 929 164 | 5/1982 |
| WO | WO 2006/036151 | 4/2006 |

OTHER PUBLICATIONS

XP-002186842 SU 929164 B (May 25, 1982), Arbitman et al. Abstract only.*
American Society for Testing and Materials, ASTM Designation D 882 (2002), Standard Test Method For Tensile Properties of Thin Plastic Sheeting.
American Society for Testing and Materials, ASTM Designation D 1003-00 (2000), Standard Test Method for Haze and Luminous Transmittance of Transparent Plastics.
American Society for Testing and Materials, ASTM Designation D 1238-00 (2001), Standard Test Method for Melt Flow Rates of Thermoplastics by Extrusion Plastometer.
American Society for Testing and Materials, ASTM Designation D 2457-97 (1997), Standard Test for Specular Gloss of Plastic Films and Solid Plastics.
American Society for Testing and Materials, ASTM Designation D 3354-96 (1996), Standard Test for Blocking Load of Plastic Film by the Parallel Plate Method.
American Society for Testing and Materials, ASTM Designation D 5630-01 (2001), Standard Test Method for Ash Content in Thermoplastic.
American Society for Testing and Materials, ASTM Designation E313-00 (2000), Standard Practice for Calculating Yellowness and Whiteness Indices from Instrumentally Measured Color Coordinates.
Bear, J.; "Dynamics of Fluids in Porous Media", American Elsevier Publishing Company, Inc., New York, 1988, pp. 161-176.
Berry, L. G. and Mason, Brian; "Natural Glasses and Macerals", Mineralogy, Second Edition, Concepts, Descriptions, Determinations, W. H. Freeman and Co., New York, 1983, pp. 540-546.
Breese, R.O.Y. and Barker, J. M.; "Perlite", Industrial Minerals and Rocks, Society for Mining, Metallurgy, and Exploration, Inc., Littleton, Colorado, 1994, pp. 735-749.
Caln, C. W. Jr.; "Filter Aid, Use in Filtration", Encyclopedia of Chemical Processing and Design, Marcel Dekker, Inc., 1984, New York, pp. 348-372.
Carman, P.; "Fluid Flow Through Granular Beds", Transactions Of The Institution of Chemical Engineers, vol. 15, 1937, Institution of Chemical Engineers, Westminster, London, pp. 150-166.
Kadey, F. L., Jr.; Industrial Minerals and Rocks, Society for Mining Engineers of the American Institute of Mining, Metallurgical, and Petroleum Engineers, Inc., New York, 1983, pp. 677-708.
Heertjes, P. M. et al.; Recueil, "Studies in Filtration"; Part 1, Delft, Laboratory For Chemical Engineering of the Technical University, vol. 68, 1949, pp. 361-383.
Heertjes, P. M. et al.; "Solid-Liquid Separation", Filter Blocking, Filter Media and Filter Aids, Laboratory of Chemical Engineering, Technical University, Delft Chemical Publishing Company, Inc., New York, 1968, pp. 37-43.
Harmanson, G. T., Mallia, A. Krishna and Smith, Paul K.; "The Matrix", Immobilized Affinity Ligand Techniques, Academic Press Inc., San Diego, 1992, pp. 1-50.
Keifer, J.; "Kieselguhr Filtration"; Overview of Theoretical Principles, Brauwelt International, IV/1991, pp. 300-309.
Nordén, H. V., and Kauppinen, Petteri; "Application of Volume Balances and the Differential Diffusion Equation to Filtration", Separation Science and Technology, vol. 29, No. 10, Marcel Dekker, Inc., 1994, pp. 1319-1334.

(Continued)

*Primary Examiner*—Paul Marcantoni
(74) *Attorney, Agent, or Firm*—Finnegan, Henderson, Farabow, Garrett and Dunner, L.L.P.

(57) ABSTRACT

Micronized perlite filler product, methods of producing the micronized expanded perlite products, and methods of use thereof are provided. The micronized expanded perlite product has, for example, a small median particle size (for example, less than 11 microns), a high blue light brightness (for example, higher than 84) and low oil absorption (for example, less than 70 percent in volume). The micronized expanded perlite product may be used in a variety of applications such as anti-block filler in plastic films and reinforcement filler in polymers.

44 Claims, No Drawings

OTHER PUBLICATIONS

Ruth, B. F.; "Correlating Filtration Theory With Industrial Practice", Industrial and Engineering Chemistry, vol. 38, No. 6, Jun. 10, 1946, pp. 564-571.

Sperry, D. R.; Metallurgical & Chemical Engineering, vol. XV, No. 4, McGraw Publishing Company, Inc. New York, Jul. 1, 1916, pp. 198-203.

Stein, H. A. and Murdock, J. B.; "The Processing of Perlite", California Journal of Mines and Geology, State of California Division of Mines, vol. 51, No. 2, Apr. 1955, pp. 105-116.

Tiller, F. M. et al.; "The Role of Porosity in Filtration", Chemical Engineering Progress, vol. 49, No. 9 American Institute of Chemical Engineers, New York, 1953, pp. 467-479.

Tiller, F. M. and Cooper, Harrison; "The Role of Porosity in Filtration: Part V. Porosity Variation in Filter Cakes", A.I.Ch.E. Journal, vol. 8, No. 4, Sep. 1962, pp. 445-449.

Tiller, F. and Shirato, Mompei; "The Role of Porosity in Filtration: VI. New Definition of Filtration Resistance", A.I.Ch.E. Journal, vol. 10, No. 1, Jan. 1964, pp. 61-67.

International Search Report dated Jun. 16, 2006 for PCT Application US/2006/008506.

English language abstract for SU 929 164, published May 23, 1982.

English language abstract for JP 08 019702, published Jan. 23, 1996.

Y.B. Bhirud & S.S. Shetty, "Role of Classification in Powder Coating Paint Production," 34 Chem. Eng'g World 61-62 (Jan. 1999).

Supplementary European Search Report for EP Application No. 04789247.8, dated Feb. 27, 2008.

Derwent Abstract for FR 2 586 588 A1.

Derwent Abstract for JP H08-019702 A.

Patent Abstracts of Japan Abstract for JP H08-019702 A.

\* cited by examiner

MICRONIZED PERLITE FILLER PRODUCT

TECHNICAL FIELD

This invention relates to an improved filler product based on micronized expanded perlite, which is useful in various filler applications.

BACKGROUND ART

Throughout this application, various publications, patents, and published patent applications are referred to by an identifying citation; full citations for these documents may be found at the end of the specification. The disclosure of the publications, patents, and published patent specifications referred in this application are hereby incorporated by reference into the present disclosure.

Fillers are added to plastics for enhancement of various structural, processing and application properties. Anti-block products are normally used in the plastic films to lessen the adhesion or blocking of the plastic film surface. This can be achieved by slightly roughening the film surface through surface treatment with wax/polymers or by adding anti-block filler products into the plastic films. Commercial anti-block filler products include synthetic silica, natural silica (such as diatomaceous earth), and other mineral products such as talc, calcium carbonate, and nepheline syenite. These additives are intended to produce microscopic roughness on the surface of the film to minimize the flat contact between adjacent layers, i.e., to prevent individual layers from sticking to one another or blocking.

Although synthetic silica has good anti-block performance and optical properties, the high cost limits its applications in the plastic films. Diatomaceous earth is an effective anti-block agent with moderate cost. The anti-block performance of other mineral products such as talc, calcium carbonate, and nepheline syenite are not as effective compared to diatomaceous earth product.

Mineral fillers have been added to thermoplastic and thermoset materials to improve their properties including tensile strength, heat distortion temperature, and modulus. Besides improvement on the properties, fillers also reduce costs since the filled thermoplastics are sold in even larger volumes than neat thermoplastics.

Thermoplastic materials are those which soften under the action of heat and harden again to their original characteristics on cooling, that is, the heating-cooling cycle is fully reversible. By conventional definition, thermoplastics are straight and branched linear chain organic polymers with a molecular bond. Examples of well-known thermoplastics include products of acrylonitrile butadiene styrene (ABS), styrene acrylonitrile (SAN), acrylate styrene acrylonitrile (ASA), methacrylate butadiene styrene (MBS). Also included are polymers of formaldehyde, known as acetals; polymers of methyl methacrylate, known as acrylic plastics; polymers of monomeric styrene, known as polystyrenes; polymers of fluorinated monomers, known as fluorocarbons; polymers of amide chains, known as nylons; polymers of paraffins and olefins, known as polyethylenes, polypropylenes, and polyolefins; polymers composed of repeating bisphenol and carbonate groups, known as polycarbonates; polymers of terephthalates, known as polyesters; polymers of bisphenol and dicarboxylic acids, known as polyarylates; and polymers of vinyl chlorides, known as polyvinyl chlorides (PVC). High performance thermoplastics have extraordinary properties, for example, polyphenylene sulfide (PPS), which has exceptionally high strength and rigidity; polyether ketone (PEK), polyether ether ketone (PEEK), polyamide imide (PAI), which have very high strength and rigidity, as well as exceptional heat resistance; and polyetherimide (PEI), which has inherent flame resistance. Unusual thermoplastics include ionomers, i.e., copolymers of ethylene and methacrylic acid that have ionic rather than covalent crosslinking which results in behavior resembling that of thermoset plastics in their operating range; polyvinylcarbazole, which has unique electrical properties; and polymers of isobutylene, known as polyisobutylenes, which are viscous at room temperature.

Thermoset plastics are synthetic resins that are permanently changed upon thermal curing, that is, they solidify into an infusible state so that they do not soften and become plastic again upon subsequent heating. However, certain thermoset plastics may exhibit thermoplastic behavior over a limited portion of their useful application ranges, and are similarly useful as matrix components in applications employing the present invention. Some types of thermoset plastics, especially certain polyesters and epoxides, are capable of cold curing at room temperature. Thermoset plastics include alkyds, phenolics, epoxides, aminos (including urea-formaldehyde and melamine-formaldehyde), polyimides, and some silicon plastics.

The adhesion of the polymer matrix onto filler particles has strong impact on the reinforcement provided by the filler. The mechanical properties can be further enhanced if the polymer matrix adheres to the filler particle surface through chemical coupling agents such as silanes.

Perlite products have been prepared by milling, screening, and thermal expansion. Depending on the quality of the perlite ore and the method of processing, expanded perlite products have been used as filter aids, lightweight insulating materials, filler materials, horticultural and hydroponic media, and chemical carriers; expanded perlite has been used in filtration applications since about the late 1940's (Breese and Barker, 1994). Expanded perlite is also used as an absorbent for treating oil spills (e.g., Stowe, 1991).

Conventional processing of perlite consists of comminution of the ore (crushing and grinding), screening, thermal expansion, milling, and air size separation of the expanded material to meet the specification of the finished product. For example, perlite ore is crushed, ground, and separated to a predetermined particle size range (e.g., passing 30 mesh), then the separated material is heated in air at a temperature of 870-1100° C. in an expansion furnace (cf. Neuschotz, 1947; Zoradi, 1952), where the simultaneous softening of the glass and vaporization of contained water leads to rapid expansion of glass particles to form a frothy glass material with a bulk volume up to 20 times that of the unexpanded ore. The expanded perlite is then air separated to meet the size specification of the final product. The expanded perlite product may further be milled and separated for use as filter aid or filler material (Breese and Barker, 1994). Some degree of separation after expansion is common, for example, using cyclones, which are simple conical devices that separate particles according to their aerodynamic mass by suspending them in a stream of air. Stein (1955) states that two or more cyclones in series are sometimes used, the first cyclone having lower efficiency than the following ones, so as to air-separate the product into several size fractions. Expanded perlite products with controlled particle size distribution can be made by classifying commercial expanded perlite products (Palm, 2002, 2004). These products may be used in a variety of applications including functional filler and filter applications.

Expanded perlite products have found widespread utility in filtration applications. The principles of filtration using porous media have been developed over many years (Carman, 1937; Heertjes, 1949, 1966; Ruth, 1946; Sperry, 1916; Tiller, 1953, 1962, 1964), and have been recently reviewed in detail from both practical perspectives (Cain, 1984; Kiefer, 1991) as well as from their underlying theoretical principles (Bear, 1988; Norden, 1994).

Perlite products are applied to a septum to improve clarity and increase flow rate in filtration processes, in a step sometimes referred to as "precoating." Perlite products are also added directly to a fluid as it is being filtered to reduce the loading of undesirable particulate at the septum while maintaining a designed liquid flow rate, in a step often referred to as "body feeding". Depending on particular separation involved, perlite products may be used in precoating, body feeding, or both. Perlite products, especially those which are surface treated, can enhance clarification or purification of a fluid (Ostreicher, 1986).

Expanded perlite products are also often used as insulating fillers, resin fillers, and in the manufacture of textured coatings (Breese and Barker, 1994).

Particle size has strong effect on both filter aid and filler applications. The selection of the proper grade of filter aid depends on the size of the suspended particles that are to be removed. The performance of fillers is also closely related to the particle size. The anti-block performance and the film physical properties enhancement through the use of a filler strongly depend on the particle size of the filler products.

Color is also important for a filler in any application, especially where color of the end product is important. Whiter filler products with high blue light brightness normally have greater utility, as they can be used in all colored and white products and, relative to non-white fillers, improved plastic film optical properties. For these reasons, micronized perlite products with high blue light brightness are often desirable.

Oil absorption of filler products has strong impact on the plastic film processing and film quality. High absorption of resin additives such as antioxidants, slip agent and processing aid by the anti-block filler can cause serious problems during the film processing and also reduce the film quality. Therefore, low oil absorption is preferred for the anti-block filler products.

The median particle size, blue light brightness and oil absorption of commercially available expanded perlite products, measured using the standard methods described below, are shown in Table I. The lowest median particle size ($d_{50}$) for the product having a blue light brightness higher than 80 is 17.87 microns (sometimes abbreviated "µ"; i.e., µm, or micrometer). The lowest oil absorption for these commercially available expanded perlite products is 182 percent by weight.

TABLE 1

| Product | Manufacturer | $d_{50}$ (µm) | Blue light Brightness | Oil Absorption (weight %) |
| --- | --- | --- | --- | --- |
| Harborlite ® 2000 | Harborlite Corp. | 58.84 | 83 | 463 |
| Harborlite ® 1950S | Harborlite Corp. | 62.40 | 73 | 337 |
| Harborlite ® 1900S | Harborlite Corp. | 54.94 | 71 | 346 |
| Harborlite ® 1500S | Harborlite Corp. | 52.64 | 69 | 374 |
| Harborlite ® 1500 | Harborlite Corp. | 50.45 | 81 | 364 |
| Harborlite ® 900S | Harborlite Corp. | 54.00 | 70 | 411 |
| Harborlite ® 900 | Harborlite Corp. | 44.37 | 82 | 355 |
| Harborlite ® 800 | Harborlite Corp. | 39.69 | 81 | 281 |
| Harborlite ® 700 | Harborlite Corp. | 38.66 | 81 | 294 |
| Harborlite ® 635 | Harborlite Corp. | 25.30 | 79 | 255 |
| Harborlite ® 500 | Harborlite Corp. | 44.15 | 76 | 287 |
| Harborlite ® 475 | Harborlite Corp. | 28.50 | 77 | 281 |
| Harborlite ® 400 | Harborlite Corp. | 36.55 | 76 | 285 |
| Harborlite ® 300C | Harborlite Corp. | 18.75 | 80 | 226 |
| Harborlite ® 200Z | Harborlite Corp. | 19.18 | 75 | 222 |
| Harborlite ® 200 | Harborlite Corp. | 21.85 | 75 | 213 |
| Europerlita ™ 1500 | Europerlita Espanola, S.A. | 52.69 | 74 | 326 |
| Europerlita ™ 900 | Europerlita Espanola, S.A. | 49.59 | 72 | 381 |
| Europerlita ™ 700 | Europerlita Espanola, S.A. | 46.45 | 71 | 294 |
| Europerlita ™ 475 | Europerlita Espanola, S.A. | 37.93 | 71 | 239 |
| Europerlita ™ 400 | Europerlita Espanola, S.A. | 22.91 | 76 | 283 |
| Europerlita ™ 350 | Europerlita Espanola, S.A. | 18.13 | 74 | 231 |
| Europerlita ™ 75 | Europerlita Espanola, S.A. | 15.98 | 70 | 218 |
| Dicalite ™ 416 | Grefco, Inc. | 12.02 | 77 | 185 |
| Dicalite ™ 426 | Grefco, Inc. | 23.91 | 82 | 183 |
| Dicalite ™ 476 | Grefco, Inc. | 49.93 | 80 | 241 |
| Clarcel Flo ™ 2A | Ceca S.A. | 53.05 | 71 | 316 |
| Randalite ™ W9 | Winkelmann Materaria S.r.L. | 33.90 | 73 | 226 |
| Randalite ™ W12 | Winkelmann Materaria S.r.L. | 42.35 | 78 | 220 |
| Randalite ™ W19 | Winkelmann Materaria S.r.L. | 43.04 | 73 | 300 |
| Randalite ™ W24 | Winkelmann Materaria S.r.L. | 45.21 | 80 | 320 |
| Randalite ™ W28 | Winkelmann Materaria S.r.L. | 53.81 | 77 | 413 |
| Randalite ™ W32 | Winkelmann Materaria S.r.L. | 63.44 | 76 | 339 |
| Topco ™ #54 | Showa Chemical Industry Co., Ltd | 5.47 | 76 | 200 |
| Topco ™ #51 | Showa Chemical Industry Co., Ltd | 34.27 | 78 | 285 |
| Topco ™ #31 | Showa Chemical Industry Co., Ltd | 37.96 | 75 | 287 |
| Topco ™ #34 | Showa Chemical Industry Co., Ltd | 39.74 | 78 | 355 |
| Topco ™ #36 | Showa Chemical Industry Co., Ltd | 44.33 | 76 | 411 |
| Topco ™ #38 | Showa Chemical Industry Co., Ltd | 45.56 | 77 | 374 |
| Roka Help ™ #419 | Mitsui Mining & Smelting Co., Ltd | 19.29 | 77 | 298 |
| Roka Help ™ #479 | Mitsui Mining & Smelting Co., Ltd | 39.43 | 73 | 281 |
| Roka Help ™ #4159 | Mitsui Mining & Smelting Co., Ltd | 47.52 | 77 | 344 |

TABLE 1-continued

| Product | Manufacturer | d$_{50}$ (μm) | Blue light Brightness | Oil Absorption (weight %) |
|---|---|---|---|---|
| SM 101 | Samson Co., Ltd. | 11.60 | 75 | 213 |
| SM 201 | Samson Co., Ltd | 17.87 | 81 | 357 |
| SM 441 | Samson Co., Ltd | 37.03 | 79 | 290 |
| SM 501 | Samson Co., Ltd | 52.21 | 77 | 355 |
| SM 601 | Samson Co., Ltd | 56.65 | 74 | 350 |
| SM 771 | Samson Co., Ltd | 60.02 | 75 | 438 |
| SM 881 | Samson Co., Ltd | 62.17 | 75 | 440 |
| SM 901 | Samson Co., Ltd | 62.98 | 75 | 433 |

There is a need for a micronized perlite product with fine particle size, high blue lightness brightness, and low oil absorption for various filler applications.

SUMMARY OF THE INVENTION

A micronized perlite filler product is provided having a median particle size less than 11 microns in an exemplary embodiment. In alternative embodiments, the micronized perlite filler product is provided with a median particle size less than 10.5 microns, 10 microns, 8 microns, 6 microns, 4 microns and 2 microns.

The micronized perlite filler product of the present invention is also provided with a blue light brightness greater than 80 and in alternative embodiments with a blue light brightness greater than 82, 84, 86 and 88.

The micronized perlite filler product of the present invention is also provided having an oil absorption of less than 70 percent by weight and in alternative embodiments having and oil absorption of less than 65 percent by weight, 60 percent by weight, 55 percent by weight, 50 percent by weight and 45 percent by weight.

The micronized perlite filler product of the present invention is also provided having an anti-block index higher than 20 percent in low density polyethylene films and in alternative embodiments having an anti-block index in low density polyethylene films of higher than 30 percent, 40 percent, 50 percent, 60 percent, 70 percent and 75 percent.

The micronized perlite filler product of the present invention is also provided having a haze index less than −5 percent in low density polyethylene films and in alternative embodiments having a haze index in low density polyethylene films of less than −10 percent, −15 percent and −20 percent.

The micronized perlite filler product of the present invention is also provided as a reinforcing filler for thermoset plastics and thermoplastic materials. For certain embodiments of the micronized perlite filler product, the surface of the product is modified by silanization. In certain embodiments, the silanization increases the hydrophobic properties of the product. In alternative embodiments, the silanization increases the hydrophilic properties of the product.

Another aspect of the present invention employs a method of preparing the micronized perlite filler product using stirred media mill equipment.

Still another aspect of the present invention employs a method of preparing micronized perlite filler product using jet mill equipment.

Still another aspect of the present invention employs a method of preparing micronized perlite filler product using ball mill equipment.

Still another aspect of the present invention employs a method of preparing micronized perlite filler product using ball mill combined with air classifier.

MODES FOR CARRYING OUT THE INVENTION

The present invention provides a filler product having very fine particle size. One embodiment of the invention provides an expanded perlite product having a very fine particle size (for example, less than 11 microns).

In a further embodiment, the micronized perlite filler product is characterized by high blue light brightness (for example, greater than 80), and/or low oil absorption (for example, less than 70 percent by weight). The micronized perlite filler product advantageously has very fine particle size, low oil absorption, and high blue light brightness, thereby permitting much greater utility in anti-block filler applications.

Perlite

Micronized perlite filler products are disclosed herein, as well as methods of making, and methods of use thereof. The micronized perlite filler product is derived from the expanded natural glass, perlite. The perlite product is useful in a variety of filtration and functional filler applications. The intricate porous and cellular structure of the siliceous perlite product promotes its usefulness for the physical entrapment of particles in filtration processes, and also for modifying properties of various materials when added as a functional filler.

The micronized perlite product disclosed herein is derived from perlite ore, which belongs to the class of natural glasses. The term "natural glass" is used herein the conventional sense and refers to natural glasses, commonly referred to as volcanic glasses, which are formed by the rapid cooling of siliceous magma or lava. Most natural glasses are chemically equivalent to rhyolite. Natural glasses which are chemically equivalent to trachyte, dacite, andesite, latite, and basalt are known but are less common. The term "obsidian" is generally applied to dark, most often black, massive natural glasses that are rich in silica (i.e., $SiO_2$). Obsidian glasses may be classified into subcategories according to their silica content, with rhyolitic obsidians (containing typically about 73% $SiO_2$ by weight) as the most common (Berry et al., 1983).

Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% $CaO$ (by weight), and small concentrations of other metallic elements. Perlite ore is distinguished from other natural glasses by a higher content (2-10% by weight) of chemically bonded water, the presence of a vitreous, pearly luster, and characteristic concentric or arcuate onion skin-like (i.e., perlitic) fractures.

Perlite products may be prepared by methods disclosed herein which may include milling, screening, and thermal expansion. The perlite products can possess commercially valuable physical properties such as high porosity, low bulk density, and chemical inertness. Depending on the quality of the perlite ore and the method of processing, expanded perlite products can be used as filter aids, lightweight insulating materials, filler materials, horticultural and hydroponic media, and chemical carriers.

The processing of perlite can include comminution of the ore (crushing and grinding), screening, thermal expansion, milling, and air size separation of the expanded material to meet the specification of the finished product and other methods known in the art. For example, perlite ore is crushed, ground, and separated to a predetermined particle size range (e.g., passing 30 mesh), then the separated material is heated in air at a temperature of 870-1100° C. in an expansion furnace (cf. Neuschotz, 1947; Zoradi, 1952), where the simultaneous softening of the glass and vaporization of contained water leads to rapid expansion of glass particles to form a frothy glass material with a bulk volume up to 20 times that of the unexpanded ore. The expanded perlite is then separated to meet the size specification of the final product.

Expanded perlite includes one or more cells, or parts of cells, in which a cell is essentially a void space partially or entirely surrounded by walls of glass, usually formed from expansion of gases when the glass is in a softened state. The presence of gas-filled or vacuous cells in a given volume of glass results in lower centrifuged wet density than for the same volume of solid glass. If cells are closed and air is entrapped, the particles of perlite may float on liquid. Fracturing of perlite, for example, by milling, can create an intricate cellular structure that retains the characteristic of low wet density and also provides useful features for filtration and functional filler applications.

The expanded perlite products can be used in a variety of filtration applications. The term "filtration" is used herein in the conventional sense and refers to the removal of particulate matter from a fluid in which the particulate matter is suspended. An exemplary filtration process is one which comprises the step of passing the fluid through a filter aid material supported on a septum (e.g., mesh screen, membrane, or pad).

The intricate cellular structure of expanded perlite is particularly effective for the physical entrapment of particles in filtration processes. The perlite products can be applied to a septum to improve clarity and increase flow rate in filtration processes, in a step sometimes referred to as "precoating." Perlite products are also can be added directly to a fluid as it is being filtered to reduce the loading of undesirable particulate at the septum while maintaining a designed liquid flow rate, in a step often referred to as "body feeding". Depending on particular separation involved, the perlite products may be used in precoating, body feeding, or both. The perlite products, especially those which are surface treated, also may provide pre-selected properties during filtration that can further enhance clarification or purification of a fluid.

The expanded perlite products can thus be used to separate components especially particulate matter from solutions, fluids, and fluid suspensions. For example, solid particulate matter from fermentation processes may include cells, cell debris, protein aggregates, and other components that can be separated from the remaining solutions, thus clarifying the solution.

The particle size can be pre-selected for filter aid and filler applications. Particle size effects result from the average size, the top size, and the size distribution. For a filter aid of moderate permeability, the preferred average size of the filler is around 20-40, the size distribution is preferably between 3-150 microns, and the top size is preferably around 80-150 microns. For a typical flat latex paint system, the preferred average size of the filler is around 20-30, the size distribution is preferably between 3-150 microns, and the top size is preferably around 80-150 microns. For a typical low gloss or semi-gloss latex paint system, the preferred average size of the filler is around 14-18 microns, the size distribution is preferably between 2-80 microns, and the top size is preferably around 60-80 microns.

The micronized perlite filler product of the present invention has very fine particle size, high blue light brightness and low oil absorption, thereby permitting much greater utility, particularly as anti-block filler products.

Using methods disclosed herein, commercially available equipment designed to mill minerals of normal densities may be used for milling expanded perlite to thereby produce the micronized perlite filler products of the present invention. The products so made are superior in many applications to existing products, and the production process is economically attractive because a high yield of the desired product is obtained.

In one embodiment, the micronized perlite filler product is provided with a median particle size less than 11 microns. In another embodiment, the median particle size is less than 5 microns, for example, less than 4 microns, less than 3 microns, or less than 2 microns.

In another embodiment, the micronized perlite filler product is further characterized by having a blue light brightness greater than 80; greater than 82; greater than 83; or in one preferred embodiment, greater than 85.

In another preferred embodiment, the micronized perlite filler product has an oil absorption less than 70 percent by weight; less than 60 percent by weight, less than 55 percent by weight; less than 50 percent by weight; or in one preferred embodiment, less than 45 percent by weight.

A. Methods for Preparing the Micronized Perlite Filler Product

As described above, the micronized perlite filler product has a defined particle size and other unique physical properties. The micronized perlite filler product can be prepared by several methods.

One preferred method of preparing the micronized perlite filler product of the present invention is by milling on a stirred media mill with ceramic lining.

Commercially available materials are used in exemplary embodiments as feed material. For example, milled expanded perlite, such as Harborlite® 2000, is useful feed materials.

The feed material, for the embodiments disclosed herein, is milled on commercially available stirred media mill with ceramic lining. For example, a pilot scale 50-SDG Attritors (Union Process, Akron, Ohio) is used for the fine milling of expanded perlite, such as Harborlite® 2000. The Attritor is often referred to generically as a "stirred ball mill." The expanded perlite material to be ground and the grinding media are placed in a stationary, jacketed tank. The grinding media is spherical ceramic media measuring ⅜" in diameter. The grinding tank is lined with ceramics to avoid color degradation of the finish product. The expanded perlite material and the media are then agitated by a shaft with arms, rotating at high speed. This causes the media to exert both shearing and impact forces on the material, resulting in optimum size reduction and dispersion. Parameters such as shaft rotating speed, feed material loading level in the grinding tank, and grinding time are optimized to achieve various embodiments for desired products. Examples of typical parameters for the 50-SDG Attritors include: shaft rotating speed at 119 rpm, feed material loading from 45 to 65 lbs, and grinding time 5 to 20 minuets. The mill discharge is then collected as the finish product.

Other alternative methods of preparing the product of the present invention include milling through a jet mill, a ball mill, and a ball mill combined with an air classifier.

The micronized perlite filler product is further modified in alternative embodiments to enhance its performance in specific applications. For example, its surfaces are treated with wax or other materials to improve its physical properties.

The micronized perlite filler product is also modified by silanization in certain embodiments to render the surfaces either more hydrophobic or hydrophilic using the methods appropriate for silicate minerals (Moreland, 1975; Sample, 1981). For example, the micronized perlite filler product is placed in a plastic vessel, and a small quantity of dimethyldichlorosilane (i.e., $SiCl_2(CH_3)_2$) or hexadimethylsilazane (i.e., $(CH_3)_3Si—NH—Si(CH_3)_3$) is added to the vessel. Reaction is allowed to take place at the surface in the vapor phase over a 24 hr period, resulting in more hydrophobic products. Such products have applications in compositions used in chromatography, for example, and also when used in conjunction with other hydrophobic materials for improved mechanical performance, for example, in applications involving hydrocarbons and oils, and also to provide reinforcement in plastics and other polymers.

Similarly, the micronized perlite filler product is reacted to obtain other embodiments, for example, by suspending it in a solution containing 10% (w/v) aminopropyltriethoxysilane (i.e., $C_9H_{23}NO_3Si$) in water, refluxing at 70° C. for 3 hr, filtering the mixture, and drying the remaining solids to obtain more hydrophilic products. Such products have applications in compositions used in chromatography, for example, especially when used in conjunction with aqueous systems for improved mechanical performance, and to permit further derivatization of the product, having converted terminal hydroxyl (i.e., —OH) functional groups at the surface of the micronized perlite filler product to aminopropyl groups (i.e., —$(CH_2)_3NH_2$). The hydrophilic (e.g., silanized) modified micronized perlite filler product can be further reacted to bind an organic compound, for example, a protein; the micronized perlite filler product thereby serving as a support for the immobilization of the organic compound. So modified, the product has utility in applications such as affinity chromatography and biochemical purification.

In certain embodiments, the surfaces of the micronized perlite filler product are etched with etchants appropriate for glasses, including, but not limited to, hydrofluoric acid (i.e., HF), ammonium bifluoride (i.e., $NH_4F.HF$), or sodium hydroxide (i.e., NaOH). Surface etching may enhance subsequent treatment processes; for example, etching may increase the number of terminal hydroxyl groups, which in turn may subsequently react with various silanes.

A number of other reactions pertaining to the surfaces of glasses have been previously described (Hermanson, 1992). However, derivatizations of the micronized perlite filler product which offer specific properties yield products with improved efficacy.

Modifications and variations of the inventive production methods as hereinbefore set forth can be made without departing from the spirit and scope thereof.

B. Methods for Characterizing the Micronized Perlite Filler Product

1. Particle Size Distribution

The particle size distribution of samples is determined in accordance with the phenomenon of scattered light from a laser beam projected through a stream of particles. The amount and direction of light scattered by the particles is measured by an optical detector array and then analyzed by a microcomputer which calculates the size distribution of the particles in the sample stream. Data reported is collected in one exemplary embodiment on a Leeds and Northrup Microtrac X100 laser particle size analyzer (Leeds and Northrup, North Wales, Pa.). This instrument can determine particle size distribution over a particle size range from 0.12 to 704 microns. Median particle size ($d_{50}$) is defined as that size for which 50 percent of the volume that is smaller than the indicated size.

The micronized perlite filler product in one embodiment has a median particle size less than 11 microns (usually in the range of from 10 to 11 microns). In another embodiment, the median particle size is less than 10 microns (for example, in the range of 8 to 10 microns), and in further embodiments the median particle size is less than 8 microns (for example, in the range of 5 to 8 microns), the median particle size is less than 5 microns, the median particle size is less than 4 microns, the median particle size is less than 3 microns, and the median particle size is less than 2 microns (for example, in the range of 1 to 2 microns). The median particle size of the conventional perlite products is greater than 10 microns. Compared to conventional products, the present invention consists of particles of reduced median particle size.

2. Blue Light Brightness

The preferred method for determining the blue light brightness of the samples in the present invention uses calculation from Hunter scale color data collected on a Spectro/plus Spectrophotometer (Color and Appearance Technology, Inc., Princeton, N.J.). A krypton-filled incandescent lamp is used as the light source. The instrument is calibrated according to the manufacturer's instructions using a highly polished black glass standard and a factory calibrated white opal glass standard. A plastic plate having a depressing machined into it is filled with sample, which is then compressed with a smooth-faced plate using a circular pressing motion. The smooth-faced plate is carefully removed to insure an even, unmarred surface. The sample is then placed under the instrument's sample aperture for the measurements.

The micronized perlite filler product for example has a blue light brightness greater than 80 (e.g., in the range from 80 to 85); has a blue light brightness greater than 85 (e.g., in the range from 85 to 90), or has a blue light brightness greater than 90 (e.g., in the range from 90 to 91).

3. Oil Absorption

The oil absorption capacity of the samples in the present invention is determined on a weight basis. 5 or 10 grams of the sample is placed in a 300 ml ceramic casserole. Linseed oil from a 50 ml glass burette is then added to the sample at the rate of 1 drop per second. During addition of oil, the mixture is stirred using a spatula so that each drop of oil falls on a dry position of the sample. As absorption of oil progresses, the lumps of paste form larger lumps and the oil addition rate should be decreased at this point. The absorption reaches to the end point when the entire dry sample is wet and picked up. The volume of the oil used is then recorded and the oil absorption in weight percentage can thus be calculated:

Oil absorption (in weight percentage)=(volume of oil used (ml)×specific gravity of oil)/(weight of sample (g))×100

The micronized perlite filler product preferably has an oil absorption less than 70 percent by weight (usually in the range of from 65 to 70 percent by weight), more preferably has an oil absorption less than 65 percent by weight (usually in the range of from 60 to 65 percent by weight), still more preferably has an oil absorption of less than 60 percent by weight (usually in the range of 55 to 60 percent by weight), still more preferably has an oil absorption of less than 55 percent by weight (usually in the range of 50 to 55 percent by weight), still more preferably has an oil absorption of less than 50 percent by weight (usually in the range of 45 to 50 percent by weight), and still more preferably has an oil absorption of less than 45 percent by weight (usually in the range of 40 to 45 percent by weight). Compared with the oil absorption of conventional perlite products which are typically greater than 180 percent by weight, the micronized perlite filler product has a significantly lower oil absorption.

4. Anti-Block Performance Tests in Low Density Polyethylene (LDPE) Films a. Leistritz 40-mm Compounding Several products were run on the PlastiScience, LLC Leistritz 40-mm twin-screw extruder for comparison. The scheme was to first prepare seven masterbatch compounds at 20 weight percent loading of each of seven silica anti-blocks. For these LDPE materials, a feed rate of about 80 lbs per hour was targeted, as is shown on the process sheets, which are shown in the processing section. 5 to 15 lb samples were taken of each compound. All were processed utilizing vacuum in the last section of the twin screw.

Next each of these masterbatches was re-compounded to prepare three levels of each anti-block in LDPE film, for a total of 15 formulations. The compounding was accomplished by making a pre-blend of each masterbatch with LDPE pellets in a plastic container in 20 lb batches, and feeding the product into the main feed throat of the twin screw with a K-tron volumetric feeder. The formulations shown in the Table II were prepared such that 500, 1500 and 2000 ppm of each anti-block material was compounded for blown film preparation and properties.

TABLE 2

| Ingredient | Concentration (%) |
|---|---|
| Equistar NA345-013 | 97.8 to 98.55 |
| Test Samples | 0.25 or 0.5 or 1.0 |
| 1061 Slip Masterbatch | 1.00 (600 ppm) |
| Irganox B-225 | 0.20 |

The ash content of each masterbatch was verified via polymer pyrolysis at 800° C., and the residual ash determined to calculate the actual percent anti-block present. This data is shown in the following section as well. For example, since in some masterbatches the actual ash was lower or higher than theoretical, the calculated masterbatch needed was added to obtain a proper level of anti-block in the final formulation to compensate for experimental shifts in actual anti-block low or high concentration in the masterbatch.

b. Blown Film Processing

The compounds plus base resin Petrothene NA 0345-013 were extruded on a ¾ inch extruder, equipped with a metering screw of a compression ratio of 2.5 to 1.0, and a 2.50 inch diameter bottom-fed blown film die. The small die was used in view of the limited amount of each resin available. The base resin was used as a control, and labeled 30160-0. Extrusion conditions were held constant as shown in the Tables 3 and 4:

TABLE 3

| Extruder Position | Temperature (° F.) | Extruder Position | Temperature (° F.) |
|---|---|---|---|
| Zone 1 | 300 | Adapter | 450 |
| Zone 2 | 375 | Die 1 | 450 |
| Zone 3 | 450 | Die 2 | 450 |

TABLE 4

| Screw Speed (RPM) | Head Pressure (PSI) | Lay Flat Width (inches) | Blow Up Ratio |
|---|---|---|---|
| 80 | 1000 | 8 | 2.5:1 |

After purging the equipment with the base resin each compound was extruded for 20 minutes to purge the previous compound and for an additional 10 minutes to collect film samples. Slip additive present had a very slow rate of exudation, resulting in poor winding performance. With the exception of rolls 1 and 12 all film samples had very high blocking immediately after extrusion, but as shown later induced blocking demonstrated desired effects based on anti-block loading.

c. Film Testing

All film samples were conditioned for a minimum of twenty-four hours, cut and tested at 23° C. and 50% RH unless otherwise noted. Thickness was measured on each sample to be tested for tensile, blocking and optical properties.

I. Induced Blocking, ASTM D3354

6×6 inch film pair samples were prepared by separating the cut squares first from each other, and passing a grounded copper tube over the surface of the films to prevent static charge. The film pairs (inside to inside) were then stacked between sheets of engineering velum paper, and placed in sets of 5 specimens and 5 samples (total 25 pairs) on a polished aluminum plate, and placed in a forced-air HotPack environmental oven maintained at 40 ±1.5° C. and a top load of 1 psi for 24 hours.

After conditioning, ASTM D3355-74, method B blocking test was conducted, and the film-to-film adhesion expressed as a blocking load in grams that causes two layers of film to separate with an area of contact of 16 square inches (4 by 4 inches). The load was measured on a Q Test 25 load frame equipped with a 1 Newton (2.2 lb) calibrated load cell, and the average (over a crosshead travel of 0.2 to 0.5 inches) load in grams recorded, using a crosshead travel of 5.08 inches per minute.

II. Optical Properties, Haze (ASTM D1003), Yellow Index (ASTM E313) and Gloss (ASTM D2457)

Haze and yellow index were measured on a Hunter Lab Color Quest XE instrument, recording an average of five specimens for each compound. Gloss at 45° incident beam was measured on the inside surface of the lay-flat film with a BYK-Gardner Micro-Gloss 45 instrument.

III. Tensile Strength, ASTM D882

Testing was performed on 0.5 inch strips of film cut in the "transverse" (TD) and "machine" (MD) direction, per the ASTM standard using the Q Test 25 machine equipped with a calibrated 100 Newton (22.5 lb) load cell, and flat surface film grips. The average of five specimens per material and direction was recorded, and reported as ultimate and yield strength.

Elongation was expressed as travel of the crosshead, since the machine was not equipped with a film high elongation extensometer. Speed of testing was 20 inches per minute.

IV. Ash Testing, ASTM D5630

Testing was performed on pellet samples of masterbatch compounds prior to extrusion and film samples after blown film extrusion. Films were preconditioned by folding many layers into a one inch by one inch square, placing several samples into a cupcake baking pan with twelve depressions, placing a 100 gram weight on each film sample to keep flat, and placing in an air circulating oven at 120 deg C. for 10 minutes, to fuse the layers together. Once fused, each square was cut into several pieces, and used for the sample for ash testing such that at least a 5 to 7 gram film sample was used for the microwave rapid ashing test, per ASTM D5630. An oven temperature of 800 C. was used to pyrolyze the sample, for a duration of at least 20 minutes.

V. Melt Index, ASTM D1238

Testing was performed on pellet samples of compounds prior to extrusion using a Dynisco Polymer Test Melt Indexer, per the ASTM D1238 standard using 190 deg C. temperature and 2.16 kg load. The average of two specimens per material was recorded, and standard deviation and coefficient of variance reported.

5. Reinforcement Performance Tests in Nylon a. Formulation

Nylon was chosen as the polymer to evaluate micronized perlite filler product for thermoplastics since Nylon uses relatively high value fillers and has a low melt viscosity, making it more likely to penetrate and wet the test products. Nylon (PA 6), grade Akulon F-236-D from DSM was chosen in this study due to its significantly lower processing temperature. The most commonly used silane for nylon applications, gamma-aminopropyltriethoxy silane was chosen as the silane modifier.

The addition levels chosen for the test fillers were determined by two factors; the small amount of sample available in some cases and the oil absorption values. These varied from 20-30% by weight (10-20% by volume). All the test fillers were evaluated with and without surface treatment with a silane coupling agent, suitable for nylon (amino-silane). The silane level used was based on knowledge of the covering power of the silane and the fillers specific surface area, and varied from 0.4-4% by weight. When silane was used, coating was carried out by what is known as the "in-situ" method, (i.e. during compounding itself). This method is sufficient to show whether silane is effective, but is usually not the most efficient way of filler treatment. It also introduces traces of alcohol into the formulation, which is not always desirable. The silane coating was carried out with pre-dried fillers.

b. Compounding and Testing

As is usual with nylon compounding, all the materials were pre-dried. Where the test fillers were coated with silane, this was achieved by wetting the polymer granules with the silane prior to mixing with the filler powder. Any coating then takes place in the compounder.

Compounding was carried out using a Beetol twin-screw compounder. The polymer granules and filler powder were pre-mixed and fed from a single hopper. The melt was extruded in a double strand, which was cooled in a water bath and then pelletised. After drying, the pellets were injection molded into the appropriate test pieces using a standard injection molding machine. The molded specimens were equilibrated with room conditions for one week before testing. Mechanical properties such as modulus, tensile strength, impact strength were then measured.

C. Methods of Using the Micronized Perlite Filler Product

The various embodiments of micronized perlite filler product defined herein are used in a manner analogous to the currently available anti-block filler products in plastic film applications.

Certain applications gain additional benefit from using the micronized perlite filler product that has been modified or derivatized, for example, by leaching with acid or complexing agents, by etching, by silanization, or by coupling organic molecules to a silanized functionality.

The micronized perlite filler product of the present invention can mainly be used as a functional filler and, more particularly, as an anti-block filler or a reinforcing filler. Functional fillers are typically added, that is, "compounded," to other substances to make a material mixture that may commonly be referred to as "filled." The means of compounding usually allows one or more specific functional properties to be imparted to the filled material. These functional properties are often physical in nature, and may involve various mechanical or optical effects. Occasionally, chemical functionality is imparted, and this may also alter electrical properties. The micronized perlite filler product is effective when compounded in filled materials so as to impart the functionality of the improved perlite product to the filled material.

The most common method of adding the micronized perlite filler product to prepare a filled material is to blend it into a mixture at a concentration needed to impart the desired level of a property. For example, to reinforce nylon, the micronized perlite filler product may be added to a controlled-temperature twin-screw extruder to which unfilled nylon is being fed and made molten. The micronized perlite filler product is fed into the extruder through a hopper and uniformly blends in to the nylon. The mixture emerges from the extruder and is cooled. Then, for example, the mixture can be further compression molded or injection molded into useful shapes, and the molded pieces of filled nylon will be suitably reinforced compared with the unfilled nylon.

Examples of other filler applications include use of the micronized perlite filler product distribution as a flatting agent or as an aid to improve scrubbability in paints and coatings; as an anti-block agent in polymers, such as polyethylene or polypropylene film; as a functional filler in paper, including as a drainage aid and in stickies pacification in paper manufacture; as a reinforcing agent in plastics, including nylon, polypropylene, phenolics and brake pad manufacture; and as a filler for adhesive, sealant, and joint compounds.

The micronized perlite filler product is also useful in abrasive, polishing, buffing, or cleansing formulations, wherein it may impart an abrasive property. Further, the micronized perlite filler product is useful in ceramics and ceramic mixtures, including tile, asphalt, concrete, mortar, plaster, stucco, grout, and aggregate, especially to decrease the density of these materials. The micronized perlite filler product may be applied to other architectural products, including roofing shingles or sheets, architectural siding, flooring, or acoustical tile with similar efficacy.

The aforementioned applications describe the utility of the micronized perlite filler product as disclosed herein, but many other applications may be envisioned for the micronized perlite filler product.

EXAMPLES

The micronized perlite filler product of the present invention and methods for their preparation are described in the following examples, which are offered by way of illustration and not by way of limitation.

Particle size data were collected on a Leeds and Northrup Microtrac X100 laser particle size analyzer (Leeds and Northrup, North Wales, Pa.).

Examples 1 to 5 were prepared using a pilot scale ceramic lined 50-SDG Attritor stirred media mill by Union Process. A commercially available expanded perlite product, Harborlite® 2000, was used as the feed material. This feed material had a particle size distribution (PSD) from 21 µm ($d_{10}$) to 112 µm ($d_{90}$). Milling tests were conducted at batch mode with milling time ranged from 5 to 20 minutes. The milled product was then collected as the micronized perlite filler products.

Examples 6 and 7 were prepared by classify Example 1 using a lab scale Alpine™ 50 ATP classifier. Classification tests were conducted at a classifier wheel speed from 6000 rpm to 22000 rpm and air flow pressure from 8.0 to 15.0 mBar. The fine fraction was then collected as the micronized perlite filler product.

Tests to determine the particle size distribution, blue light brightness, and oil absorption were carried out according to the methods described above. The results for micronized perlite filler product are shown in Table 5. The micronized perlite filler product of these examples had a median particle size less than 10 microns, blue light brightness more than 80 and oil absorption less than 70 percent by weight.

TABLE 5

| Examples | Feed | $d_{50}$ (µm) | Blue light brightness | Oil Absorption (weight %) |
|---|---|---|---|---|
| Example 1 | Harborlite ® 2000 | 2.90 | 86.67 | 45 |
| Example 2 | Harborlite ® 2000 | 3.95 | 86.34 | 49 |
| Example 3 | Harborlite ® 2000 | 5.19 | 85.37 | 51 |
| Example 4 | Harborlite ® 2000 | 6.81 | 84.92 | 56 |
| Example 5 | Harborlite ® 2000 | 9.68 | 84.63 | 58 |
| Example 6 | Harborlite ® 2000 | 1.05 | 90.17 | 63 |
| Example 7 | Harborlite ® 2000 | 1.60 | 87.70 | 65 |

A. Anti-Block Performance in Low Density Polyethylene (LDPE) Films

The anti-block performance and the film properties of Examples 1 to 5 were evaluated in the low density polyethylene (LDPE) formulation. Two commercial mineral anti-block products, Celite® Super Floss based on flux calcined diatomaceous earth (Celite Corporation, Lompoc, Calif.) and Minbloc HC1400 based on nepheline syenite (Unimin Corporation, New Canaan, Conn.) were also evaluated for comparison. Films containing these two samples commercial were prepared and tested in a separate group of samples.

As shown in the Table 6, the blocking force decreases with increasing anti-block filler concentration from 200 to 2300 ppm. This reflects the effectiveness of the anti-block filler to reduce adhesion between film surfaces. Example 5 shows the most effective anti-blocking efficiency with blocking at 1500 ppm of 31.0 g. The rest of the samples show about the same anti-blocking performance, as the results are clustered about each other.

To compare the anti-blocking performance of the micronized perlite filler product with commercial products, an Anti-blocking Index defined as follows is used to eliminate the difference in the unfilled control films in these two test groups tested separately:

Anti-blocking Index (percentage)=(blocking of unfilled control−blocking of filled sample)/ (blocking of unfilled control)×100

The higher Anti-blocking Index indicates the higher anti-blocking efficiency of the anti-block filler products. Based on the anti-blocking index, Examples 1 to 5 all show lower blocking compared to nepheline syenite based Minbloc HC1400 product. The blocking performance of Example 4 is similar to that of diatomaceous earth based Super Floss product. Example 5 outperforms Super Floss and is the best in anti-blocking among all the products.

TABLE 6

| Examples | Measured Filler Loading (ppm) | Blocking (g) | Anti-Blocking Index (%) |
|---|---|---|---|
| Control 1 (unfilled) | 0 | 121.7 | 0 |
| Example 1 | 324 | 72.5 | 40 |
| Example 1 | 824 | 72.1 | 41 |
| Example 1 | 2021 | 62.0 | 49 |
| Example 2 | 514 | 100.0 | 18 |
| Example 2 | 957 | 77.3 | 36 |
| Example 2 | 1834 | 62.0 | 49 |
| Example 3 | 204 | 91.4 | 25 |
| Example 3 | 374 | 83.7 | 31 |
| Example 3 | 1364 | 61.1 | 50 |
| Example 4 | 344 | 94.8 | 22 |
| Example 4 | 884 | 77.2 | 37 |
| Example 4 | 2284 | 52.9 | 57 |
| Example 5 | 914 | 58.4 | 52 |
| Example 5 | 1584 | 31.0 | 75 |
| Control 2 (unfilled) | 0 | 100.6 | 0 |
| Minbloc HC 1400 | 600 | 78.8 | 22 |
| Minbloc HC 1400 | 700 | 91.7 | 9 |
| Minbloc HC 1400 | 1820 | 58.8 | 42 |
| Super Floss | 650 | 71.3 | 29 |
| Super Floss | 850 | 68.5 | 32 |
| Super Floss | 1700 | 44.7 | 56 |

Table 7 lists the optical properties of the films filled with the micronized perlite filler product of the present invention.

Normally when filler is added into a clear film, the film will turn cloudy or the haze of the film will increase. The best performer is Example 2 with haze lower than the unfilled control at 514 and 957 ppm loading. The haze of this sample only increases slightly to the same level as the control at 1800 ppm loading. Examples 1 and 5 have almost the same haze as the control at all loading levels. Examples 3 and 4 show the similar haze to the unfilled control at lower loading levels but the haze increase to above 6% at higher filler loading levels.

Similar to Anti-blocking Index, Haze Index and Gloss Index defined as follows are also used to eliminate the difference in the unfilled control films in the different test groups tested separately:

Haze Index (percentage)=(haze of filled sample−haze of unfilled control)/(haze of unfilled control)×100

Gloss Index (percentage)=(gloss of filled sample−gloss of unfilled control)/(gloss of unfilled control)×100

The lower Haze Index indicates the lower haze of the anti-block filler products. The higher Gloss Index indicates the higher gloss of the anti-block filler products.

Compared to the commercial anti-block filler products, the haze of Examples 2 is similar to that of nepheline syenite based Minbloc HC1400 product but lower than that of diatomaceous earth based Super Floss product. Examples 1 and 5 also show lower haze than Super Floss product at higher loading levels.

Except Example 4 at 344 ppm loading and Minbloc HC1400 at 1820 ppm loading, all the anti-block filler products have no significant impact on the film gloss.

TABLE 7

| Examples | Measured Filler Loading (ppm) | Haze (%) | Haze Index (%) | Gloss | Gloss Index (%) |
|---|---|---|---|---|---|
| Control 1 (unfilled) | 0 | 5.96 | 0 | 81.1 | 0 |
| Example 1 | 324 | 5.62 | −6 | 81.0 | 0 |
| Example 1 | 824 | 5.75 | −4 | 81.2 | 0 |
| Example 1 | 2021 | 5.10 | −14 | 79.9 | −1 |
| Example 2 | 514 | 4.70 | −21 | 80.7 | 0 |
| Example 2 | 957 | 4.91 | −18 | 79.8 | −2 |
| Example 2 | 1834 | 5.28 | −11 | 79.6 | −2 |
| Example 3 | 204 | 4.60 | −23 | 80.3 | −1 |
| Example 3 | 374 | 6.52 | 9 | 82.3 | 1 |
| Example 3 | 1364 | 6.22 | 4 | 80.3 | −1 |
| Example 4 | 344 | 5.90 | −1 | 84.9 | 5 |
| Example 4 | 884 | 5.70 | −4 | 82.5 | 2 |
| Example 4 | 2284 | 6.83 | 15 | 78.4 | −3 |
| Example 5 | 914 | 5.84 | −2 | 81.9 | 1 |
| Example 5 | 1584 | 5.75 | −4 | 79.6 | −2 |
| Control 2 (unfilled) | 0 | 6.71 | 0 | 75.2 | 0 |
| Minbloc HC 1400 | 600 | 5.85 | −13 | 73.2 | −3 |
| Minbloc HC 1400 | 700 | 5.82 | −13 | 75.7 | 1 |
| Minbloc HC 1400 | 1820 | 5.98 | −11 | 77.9 | 4 |
| Super Floss | 650 | 5.63 | −16 | 76.2 | 1 |
| Super Floss | 850 | 6.55 | −2 | 75.4 | 0 |
| Super Floss | 1700 | 7.97 | 19 | 73.4 | 2 |

Table 8 displays the tensile strength of the films filled with the micronized perlite filler product of the present invention in the machine direction (MD) and transverse direction (TD). Overall in the TD most of the anti-block filler products do not have a negative affect, with the exception of Example 5, which lowers the tensile strength in TD more than the experimental error at 1584 ppm, to a level of 1,710 psi. All the rest are neutral, within experimental error and within the anti-block ranges studied. In the MD direction, an overall reduction in tensile with all of the anti-blocks studied. Only Example 3 exhibited a much less reduction than the other Examples, and had a tensile strength of 2,135 psi for the film versus the others that were well below 2000 psi.

Similar to Anti-blocking Index, Tensile Strength Index defined as follows is also used to eliminate the difference in the unfilled control films in the different test groups tested separately:

Tensile Strength Index (percentage)=(tensile strength of filled sample−tensile strength of unfilled control)/(tensile strength of unfilled control)×100

The higher Tensile Strength Index indicates the higher tensile strength of the micronized perlite anti-block filler products. The commercial anti-block filler products of nepheline syenite based Minbloc HC1400 product and diatomaceous earth based Super Floss product all have positive impact on the tensile strength in the MD direction. Examples 2 is the only product has the positive impact on the tensile strength in the TD direction at all loadings. Except at 1820 ppm for Minbloc HC1400, an overall reduction in TD direction is observed for the commercial products.

TABLE 8

| Examples | Measured Filler Loading (ppm) | Tensile Strength MD | Tensile Strength MD Index (%) | Tensile Strength TD | Tensile Strength TD Index (%) |
|---|---|---|---|---|---|
| Control 1 (unfilled) | 0 | 2644 | 0 | 2150 | 0 |
| Example 1 | 324 | 2868 | 8 | 3050 | 42 |
| Example 1 | 824 | 1737 | −34 | 1920 | −11 |
| Example 1 | 2021 | 1830 | −31 | 2670 | 24 |
| Example 2 | 514 | 2783 | 5 | 2490 | 16 |
| Example 2 | 957 | 2740 | 4 | 2550 | 19 |
| Example 2 | 1834 | 1432 | −46 | 2220 | 3 |
| Example 3 | 204 | 2798 | 6 | 2870 | 33 |
| Example 3 | 374 | 1988 | −25 | 2050 | −5 |
| Example 3 | 1364 | 2155 | −18 | 2440 | 13 |
| Example 4 | 344 | 1710 | −35 | 2430 | 13 |
| Example 4 | 884 | 2350 | −11 | 2090 | −3 |
| Example 4 | 2284 | 1790 | −32 | 2330 | 8 |
| Example 5 | 914 | 2560 | −3 | 1780 | −17 |
| Example 5 | 1584 | 1850 | −30 | 1710 | −20 |
| Control 2 (unfilled) | 0 | 2380 | 0 | 2240 | 0 |
| Minbloc HC 1400 | 600 | 2920 | 23 | 2230 | 0 |
| Minbloc HC 1400 | 700 | 2420 | 2 | 1570 | −30 |
| Minbloc HC 1400 | 1820 | 2970 | 25 | 2510 | 12 |
| Super Floss | 650 | 2920 | 23 | 2230 | 0 |
| Super Floss | 850 | 2800 | 18 | 2170 | −3 |
| Super Floss | 1700 | 2570 | 8 | 1890 | −16 |

Table 9 shows the impact of the micronized perlite filler product on the yellowness index (YI) and melt index of the final formulations. YI is an instrument measurement of color that many LDPE producers use to specify good quality product showing a degree of whiteness, or lack of yellowness. The results on all the samples show YI well below 0, which is on the blue side of the color spectrum. The color for all formulations decreases from −5.6 of the unfilled control for all formulations as the micronized perlite filler product content is increased.

Melt index measures how easily the resin flows. The melt index of all the Examples is essentially the same within the experimental error. This indicates that there is no impact on melt viscosity as measured by melt index up to 2000 ppm loading.

TABLE 9

| Examples | Measured Filler Loading (ppm) | Yellow Index | Melt Index |
|---|---|---|---|
| Control 1 (unfilled) | 0 | −5.71 | 1.68 |
| Example 1 | 324 | −4.65 | 1.74 |
| Example 1 | 824 | −4.46 | 1.71 |
| Example 1 | 2021 | −3.57 | 1.70 |
| Example 2 | 514 | −5.12 | 1.72 |
| Example 2 | 957 | −4.83 | 1.71 |
| Example 2 | 1834 | −4.00 | 1.71 |
| Example 3 | 204 | −5.31 | 1.73 |
| Example 3 | 374 | −5.10 | 1.77 |
| Example 3 | 1364 | −4.29 | 1.69 |
| Example 4 | 344 | −5.08 | 1.75 |
| Example 4 | 884 | −4.71 | 1.73 |
| Example 4 | 2284 | −3.94 | 1.73 |
| Example 5 | 914 | −4.49 | 1.78 |
| Example 5 | 1584 | −4.20 | 1.74 |

B. Performance as Reinforcing Fillers for Thermoplastics

The performance of Example 7 as a reinforcing filler for thermoplastics was evaluated in Nylon formulation. Two standard commercial nylon filler products, calcined clay Polarite 102 A (Imerys, Paris, France) and glass beads Spheriglass CP03 (Potters Industries Inc., Valley Forge, Pa.), were used as controls. Polarite 102 A was pre-treated with an amino-silane coupling agent by the manufacturers (level unknown). These two fillers were used at 35 percent by weight. Because of the density differences, the volume percent loadings were closer than the weight percent loadings would suggest. The physical properties of these products are listed in Table 10. The originally intended loading level for Example 7 was at 35 percent by weight, but it was reduced to 30% percent by weight due to insufficient amount of sample.

TABLE 10

| Physical Properties | Polarite 102 A (Calcined Clay) | Spheriglass CP03 (Glass Beads) | Example 7 |
|---|---|---|---|
| Surface Area (m²/g) | 8.5 | <1 | 6 |
| Average Particle Size (micron) | 2 | 10-20 | 2 |
| Specific Gravity | 2.6 | 2.5 | 2.2-2.4 |
| Oil Absorption | Not available | Not available | 47 |
| Hardness (Moh) | 4 | Not available | 4-5 |
| Refractive Index | 1.6 | 1.5 | 1.5 |
| Water Content (%) | <0.5 | <0.5% | >4% |

Table 11 shows a qualitative description on the color. The silane treatment only had a small effect on color.

TABLE 11

| Product | Color |
|---|---|
| Spheriglass CP03 (glass Beads) | Dark but quite translucent |
| Polarite 102 A (calcined clay) | Dark, but not very translucent |
| Example 7 | Cream, not very translucent |

A rough estimate was made from the weight of injection molded specimens, using the unfilled nylon as the standard (specific gravity=1.13). The results are listed in Table 12.

TABLE 12

| Product | Density (g/cm³) |
|---|---|
| Unfilled PA | 1.13 |
| Spheriglass CP03 (glass beads, 35% by weight nominal) | 1.43 |
| Polarite 102 A (calcined clay, 35% by weight nominal) | 1.40 |
| Example 7 (30% by weight nominal) | 1.31 |

Powdered fillers tend to separate in the feed hopper and some often remains on the walls. This can result in lower filler levels than aimed for when small amounts are compounded. Some of the compounds were checked by ashing test to confirm the actual loading level. For example, the actual loading level for Polarite 102 A (calcined clay) was 32.2 percent by weight as compared to the nominal 35 percent by weight. This indicates the actual loading levels are consistent with nominal loading levels.

Table 13 shows the test results on the mechanical properties of the products. The test results for the controls are in line with published data. As expected, both glass beads and calcined clay significantly increase the modulus and the glass beads give a lower tensile and impact strength than the calcined clay, due to their larger particle size.

Example 7 shows respectable levels of modulus and strength. It appears to respond well to the silane, which increases both tensile and impact strengths. Modulus is also a key property and the levels achieved are generally slightly less than for the clay (which, assuming that the loadings were correct was at a slightly higher filler level). The impact strength is also a very important property and the high levels obtainable could be very valuable.

TABLE 13

| Filler Product | Level wt % | Level v % | Modulus (Mpa) Tensile | Modulus (Mpa) Flexural | Tensile Strength (Mpa) | Impact Strength (Un-notched, KJ/m²) |
|---|---|---|---|---|---|---|
| None | 0 | 0 | 2750 | 1420 | 67 | >100 |
| Spheriglass CP03 Glass Beads | 35 | 19 | 5265 | 2640 | 58 | 22 |
| Polarite 102 A Calcined Clay | 35 | 19 | 5700 | 2990 | 79 | 62 |
| Example 7 | 30 | 17 | 5100 | 2835 | 77 | 57 |
| Example 7 + 1.2% Silane | 30 | 17 | 4840 | 2705 | 77 | 97 |

The performance of Example 7 in Nylon 66 was also evaluated (Table 14). It was tested at the 30% filler level with and without silane addition. Two silane levels at 0.6% and 1.0% were arbitrarily chosen. Example 7 responded well to the silane and the mechanical properties were improved with silane addition. Addition level at 0.6% silane was certainly adequate judging by the result at 1%.

TABLE 14

| Silane Level (A-1100) | Yield Stress (Mpa) | Secant Modulus (Mpa) | Elongation Yield (%) | Elongation Break (%) | Impact Strength (T KJ/m²) Un-notched | Impact Strength (T KJ/m²) Notched |
|---|---|---|---|---|---|---|
| 0 | 88.1 | 5789 | 2.6 | 3.0 | 43 | 8.4 |
| 0.6% | 90.9 | 5392 | 9.9 | 14.0 | >100 | 12.2 |
| 1.0% | 91.0 | 5606 | 10.0 | 12.9 | >100 | 12.9 |

D. Publications

The disclosures of the publications, patents, and published patent specifications referenced below are hereby incorporated by reference into the present disclosure in their entirety.

American Society for Testing and Materials, ASTM Designation D 882 (2002), *Standard Test Method for Tensile Properties of Thin Plastic Sheeting*

American Society for Testing and Materials, ASTM Designation D 1003-00 (2000), *Standard Test Method for Haze and Luminous Transmittance of Transparent Plastics.*

American Society for Testing and Materials, ASTM Designation D 1238-00 (2001), *Standard Test Method for Melt Flow Rates of Thermoplastics by Extrusion Plastometer.*

American Society for Testing and Materials, ASTM Designation D 2457-97 (1997), *Standard Test Method for Specular Gloss of Plastic Films and Solid Plastics.*

American Society for Testing and Materials, ASTM Designation D 3354-96 (1996), *Standard Test Method for Blocking Load of Plastic Film by the Parallel Plate Method.*

American Society for Testing and Materials, ASTM Designation D 5630-01 (2001), *Standard Test Method for Ash Content in Thermoplastics Document Number.*

American Society for Testing and Materials, ASTM Designation E313-00 (2000), *Standard Practice for Calculating Yellowness and Whiteness Indices from Instrumentally Measured Color Coordinates Document Number.*

Bear, J. (1988), *Dynamics of Fluids in Porous Media* (New York: Dover Publications, Inc.), pp. 161-176.

Berry, L. G. et al. (1983), *Mineralogy* (Second Edition) (New York: Freeman and Co.); pp. 540-542.

Breese, R. O. Y. and Barker, J. M. (1994), *in Industrial Minerals and Rocks* (Littleton, Colo.: Society for Mining, Metallurgy, and Exploration, Inc.), pp. 735-749.

Cain, C. W. Jr. (1984), *in Encyclopedia of Chemical Processing and Design* (New York: Marcel Dekker), pp. 348-372.

Carman, P. (1937), *Trans. Institution of Chem. Eng*, pp. 150-166.

Kadey, F. L. Jr. (1983), *in Industrial Minerals and Rocks* (Littleton, Colo.: Society for Mining, Metallurgy, and Exploration, Inc.), pp. 677-708.

Heertjes, P. et al. (1949), *Recueil*, Vol. 68, pp. 361-383.

Heertjes, P. et al. (1966), *in Solid-Liquid Separation* (London: Her Majesty's Stationery Office), pp. 37-43.

Hermanson, G. T. et al. (1992), *Immobilized Affinity Ligand Techniques* (San Diego: Academic Press Inc.).

Keifer, J. (1991), *Brauwelt International*, IV/1991, pp. 300-309.

Leeds and Northrup (1993, North Wales, Pa.), Microtrac® X-100 & SRA150 Operator's Manual 179551, Rev. B.

Moreland, J. E. (1975), U.S. Pat. No. 3,915,735.

Neuschotz, R. (1947), U.S. Pat. No. 2,431,884.

Nordén, H. et al.(1994), *Separation Science and Technology*, Vol. 29(10), pp. 1319-1334.

Ostreicher, E. A. (1986), U.S. Pat. No. 4,617,128.

Palm, S. K. et al. (2002), U.S. Pat. No. 6,464,770.

Palm, S. K. et al. (2004), U.S. Pat. No. 6,712,898.

Ruth, B. (1946), *Industrial and Engineering Chemistry*, Vol. 38(6), pp. 564-571.

Sample, T. E., Jr. and Horn, J. M. (1981), U.S. Pat. No. 4,260,498.

Sperry, D. (1916), *Metallurgical and Chemical Eng.*, Vol. XV(4), pp. 198-203.

Stein, H. A. et al. (1955) California Journal of Mines and Geology, State of California Division of Mines; Vol. 51, No. 2; pp. 105-116.

Stowe, G. B. (1991), U.S. Pat. No. 5,035,804.

Tiller, F., et al. (1953), *Chemical Engineering Progress*, Vol. 49(9), pp. 467-479.

Tiller, F., et al. (1962), *A.I.Ch.E. Journal*, Vol. 8(4), pp. 445-449.

Tiller, F., et al. (1964), *A.I.Ch.E. Journal*, Vol. 10(1), pp. 61-67.

Zoradi, E. D. (1952), U.S. Pat. No. 2,602,782.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A micronized perlite filler product having a median particle size less than 4 microns and an oil absorption of less than 70 percent by weight.

2. The micronized perlite filler product of claim 1, wherein the median particle size is less than 2 microns.

3. The micronized perlite filler product of claim 1, wherein the product has a blue light brightness greater than 80.

4. The micronized perlite filler product of claim 3, wherein the product has a blue light brightness greater than 82.

5. The micronized perlite filler product of claim 4, wherein the product has a blue light brightness greater than 84.

6. The micronized perlite filler product of claim 5, wherein the product has a blue light brightness greater than 86.

7. The micronized perlite filler product of claim 6, wherein the product has a blue light brightness greater than 88.

8. The micronized perlite filler product of claim 7, wherein the product has a blue light brightness greater than 90.

9. The micronized perlite filler product of claim 1, wherein the product has an oil absorption of less than 65 percent by weight.

10. The micronized perlite filler product of claim 9, wherein the product has an oil absorption of less than 60 percent by weight.

11. The micronized perlite filler product of claim 10, wherein the product has an oil absorption of less than 55 percent by weight.

12. The micronized perlite filler product of claim 11, wherein the product has an oil absorption of less than 50 percent by weight.

13. The micronized perlite filler product of claim 12, wherein the product has an oil absorption of less than 45 percent by weight.

14. The micronized perlite filler product of claim 1, wherein the product has anti-block index higher than 20 percent in low density polyethylene films.

15. The micronized perlite filler product of claim 14, wherein the product has anti-block index higher than 30 percent in low density polyethylene films.

16. The micronized perlite filler product of claim 15, wherein the product has anti-block index higher than 40 percent in low density polyethylene films.

17. The micronized perlite filler product of claim 16, wherein the product has anti-block index higher than 50 percent in low density polyethylene films.

18. The micronized perlite filler product of claim 17, wherein the product has anti-block index higher than 60 percent in low density polyethylene films.

19. The micronized perlite filler product of claim 18, wherein the product has anti-block index higher than 70 percent in low density polyethylene films.

20. The micronized perlite filler product of claim 19, wherein the product has anti-block index higher than 75 percent in low density polyethylene films.

21. The micronized perlite filler product of claim 1, wherein the product has haze index less than −5 percent in low density polyethylene films.

22. The micronized perlite filler product of claim 21, wherein the product has haze index less than −10 percent in low density polyethylene films.

23. The micronized perlite filler product of claim 22, wherein the product has haze index less than −15 percent in low density polyethylene films.

24. The micronized perlite filler product of claim 23, wherein the product has haze index less than −20 percent in low density polyethylene films.

25. The micronized perlite filler product of claim 1, wherein the product has reinforcing effect in polymers.

26. The micronized perlite filler product of claim 25, wherein the surface of the product is modified with aminopropyltriethoxy silane.

27. The micronized perlite filler product of claim 1, wherein the product can be used as a functional filler in paints, coatings and papers.

28. A micronized perlite anti-block filler product having a median particle size less than 4 microns and an oil absorption of less than 70 percent by weight.

29. The micronized perlite anti-block filler product of claim 28, wherein the median particle size is less than 2 microns.

30. The micronized perlite anti-block filler product of claim 28, wherein the product has a blue light brightness greater than 80.

31. The micronized perlite anti-block filler product of claim 30, wherein the product has a blue light brightness greater than 82.

32. The micronized perlite anti-block filler product of claim 31, wherein the product has a blue light brightness greater than 84.

33. The micronized perlite anti-block filler product of claim 32, wherein the product has a blue light brightness greater than 86.

34. The micronized perlite anti-block filler product of claim 33, wherein the product has a blue light brightness greater than 88.

35. The micronized perlite anti-block filler product of claim 34, wherein the product has a blue light brightness greater than 90.

36. A micronized perlite reinforcing filler product having a median particle size less than 4 microns and an oil absorption of less than 70 percent by weight for reinforcement of thermoset and thermoplastic materials.

37. The micronized perlite reinforcing filler product of claim 36 wherein the surface of the product is modified by silanization.

38. The micronized perlite reinforcing filler product of claim 37 wherein the silanization increases the hydrophobic properties of the product.

39. The micronized perlite reinforcing filler product of claim 38 wherein the silanization comprises modifying the product with Dimethyldichlorosilane.

40. The micronized perlite reinforcing filler product of claim 38 wherein the silanization comprises modifying the product with Hexadimethylsilazane.

41. The micronized perlite reinforcing filler product of claim 37 wherein the silanization increases the hydrophilic properties of the product.

42. The micronized perlite reinforcing filler product of claim 41 wherein the silanization comprises modifying the product with aminopropyltriethoxysilane.

43. The micronized perlite reinforcing filler product of claim 37 wherein the surface of the product is etched prior to silanization.

44. The micronized perlite reinforcing filler product of claim 43 wherein an etchant is hydrofluoric acid, ammonium bifluoride, or sodium hydroxide.

* * * * *